United States Patent
Liu et al.

(10) Patent No.: US 12,260,032 B1
(45) Date of Patent: Mar. 25, 2025

(54) KNOB APPARATUS AND OPERATION METHOD THEREOF

(71) Applicant: Novatek Microelectronics Corp., Hsinchu (TW)

(72) Inventors: Chun Yuan Liu, Tainan (TW); Yun-Hsiang Yeh, Hsinchu (TW); Yen-Heng Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/530,129

(22) Filed: Dec. 5, 2023

(51) Int. Cl.
| | |
|---|---|
| *G06F 3/033* | (2013.01) |
| *B60K 35/00* | (2006.01) |
| *G06F 3/0362* | (2013.01) |
| *G06F 3/039* | (2013.01) |
| *G06F 3/041* | (2006.01) |
| *B60K 35/10* | (2024.01) |

(52) U.S. Cl.
CPC ............ *G06F 3/0362* (2013.01); *B60K 35/00* (2013.01); *G06F 3/0393* (2019.05); *G06F 3/04166* (2019.05); *B60K 35/10* (2024.01); *B60K 2360/126* (2024.01); *B60K 2360/1434* (2024.01)

(58) Field of Classification Search
CPC .... G06F 3/0349; G06F 3/0362; G06F 3/0393; G06F 3/041; G06F 3/04166; B60K 5/00; B60K 5/10; B60K 2360/126; B60K 2360/143
See application file for complete search history.

(56) References Cited

U.S. PATENT DOCUMENTS

| | | | |
|---|---|---|---|
| 8,669,943 B2 | 3/2014 | Trent, Jr. et al. | |
| 9,488,460 B2 | 11/2016 | Schenkewitz et al. | |
| 10,921,913 B1* | 2/2021 | Fong | G06F 3/04162 |
| 11,687,175 B2 | 6/2023 | Shepelev | |
| 11,928,271 B1* | 3/2024 | Fong | G06F 3/0362 |
| 11,983,338 B1* | 5/2024 | Fong | G01L 1/142 |

(Continued)

FOREIGN PATENT DOCUMENTS

| | | | | |
|---|---|---|---|---|
| CN | 104718592 | | 6/2015 | |
| CN | 111857234 A | * | 10/2020 | G05G 10/10 |

(Continued)

OTHER PUBLICATIONS

"Office Action of Taiwan Counterpart Application", issued on Dec. 23, 2024, p. 1-p. 8.

*Primary Examiner* — Joe H Cheng
(74) *Attorney, Agent, or Firm* — JCIPRNET

(57) ABSTRACT

A knob apparatus includes a touch panel, a touch-sensing controller, and a knob. The touch panel has multiple touch-sensing electrodes. The touch-sensing controller is coupled to the touch-sensing electrodes of the touch panel. The touch-sensing controller detects a touch event of the touch panel through the touch-sensing electrodes. The knob has a base and a knob cap. The knob cap is pivoted on the base. The base is attached to the touch panel. Multiple conductive electrodes are disposed at different positions of the base. The touch-sensing controller detects the conductive electrodes of the base of the knob through the touch-sensing electrodes of the touch panel to learn a rotation direction of the knob cap on the base.

22 Claims, 12 Drawing Sheets

(56) References Cited

U.S. PATENT DOCUMENTS

| | | | |
|---|---|---|---|
| 2003/0095096 A1* | 5/2003 | Robbin | G06F 3/0482 |
| | | | 345/156 |
| 2015/0241195 A1 | 8/2015 | Schenkewitz et al. | |
| 2017/0316901 A1* | 11/2017 | Sawada | H01H 19/02 |
| 2018/0091144 A1 | 3/2018 | Kwon et al. | |
| 2019/0337389 A1* | 11/2019 | Barvesten | G06F 3/0362 |
| 2022/0091697 A1 | 3/2022 | Miyagawa | |
| 2022/0413641 A1 | 12/2022 | Takabayashi et al. | |
| 2024/0019947 A1* | 1/2024 | Hirakawa | G06F 3/0362 |

FOREIGN PATENT DOCUMENTS

| | | | | |
|---|---|---|---|---|
| CN | 113703618 A | * | 11/2021 | |
| CN | 114651223 | | 6/2022 | |
| CN | 114981909 | | 8/2022 | |
| KR | 20190063912 A | * | 6/2019 | |
| WO | WO-2023203358 A1 | * | 10/2023 | G06F 3/0202 |

* cited by examiner

| state | A1 | B1 | C1 |
|---|---|---|---|
| 1 | 1 | 0 | 0 |
| 2 | 0 | 1 | 0 |
| 3 | 0 | 0 | 1 | rotate clockwise rotate counterclockwise

| state | A3 | B3 | C3 | D3 | E3 | F3 |
|---|---|---|---|---|---|---|
| 1 | 1 | 0 | 0 | 0 | 0 | 0 |
| 2 | 0 | 1 | 0 | 0 | 0 | 0 |
| 3 | 0 | 0 | 1 | 0 | 0 | 0 |
| 4 | 0 | 0 | 0 | 1 | 0 | 0 |
| 5 | 0 | 0 | 0 | 0 | 1 | 0 |
| 6 | 0 | 0 | 0 | 0 | 0 | 1 | rotate clockwise rotate counterclockwise

KNOB APPARATUS AND OPERATION METHOD THEREOF

BACKGROUND

Technical Field

This disclosure relates to a touch apparatus, and in particular to a knob apparatus and an operation method thereof.

Description of Related Art

Nowadays, many vehicle center information displays (CIDs) are equipped with touch functions. For example, drivers can touch the CID (touch panel) to adjust the temperature, volume, or other system values. When the drivers adjust the system values in their vehicles, they need to spend more time to pay attention to the touch position of the CID and the related values, which leads to safety concerns.

SUMMARY

The disclosure provides a knob apparatus and an operation method thereof for realizing a physical knob function on a touch panel.

In an embodiment of the disclosure, the knob apparatus includes a touch panel, a touch-sensing controller, and a knob. The touch panel has multiple touch-sensing electrodes. The touch-sensing controller is coupled to the touch-sensing electrodes of the touch panel. The touch-sensing controller is configured to detect a touch event of the touch panel through the touch-sensing electrodes. The knob has a base and a knob cap. The knob cap is pivoted on the base. The base is attached to the touch panel. Multiple conductive electrodes are disposed at different positions of the base. The touch-sensing controller detects the conductive electrodes of the base of the knob through the touch-sensing electrodes of the touch panel to learn a rotation direction of the knob cap on the base.

In an embodiment of the disclosure, the operation method includes the following. Multiple touch-sensing electrodes are disposed on the touch panel, in which the touch-sensing electrodes are configured to detect a touch event of the touch panel. A knob is attached to the touch panel, in which the knob has a base and a knob cap, the knob cap is pivoted on the base, and the base is attached to the touch panel. Multiple conductive electrodes are disposed at different positions of the base of the knob. The conductive electrodes of the base of the knob are detected through the touch-sensing electrodes of the touch panel to learn a rotation direction of the knob cap on the base.

Based on the above, the knob described in the embodiments of the disclosure is attached to the touch panel. The knob has a base and a knob cap, the knob cap is pivoted on the base, and the base is attached to the touch panel. There are different conductive electrodes at different positions of the base of the knob. Due to a rotational movement of the knob cap on the base, electrical changes (e.g., changes in capacitive properties) occur in the conductive electrodes of the base of the knob. The touch-sensing controller may detect the conductive electrodes of the base of the knob through the touch-sensing electrode of the touch panel to obtain different sensing results. Based on the difference in the sensing results of the conductive electrodes, the touch-sensing controller may learn the rotation direction of the knob cap on the base. Thus, the knob apparatus may realize the physical knob function on the touch panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
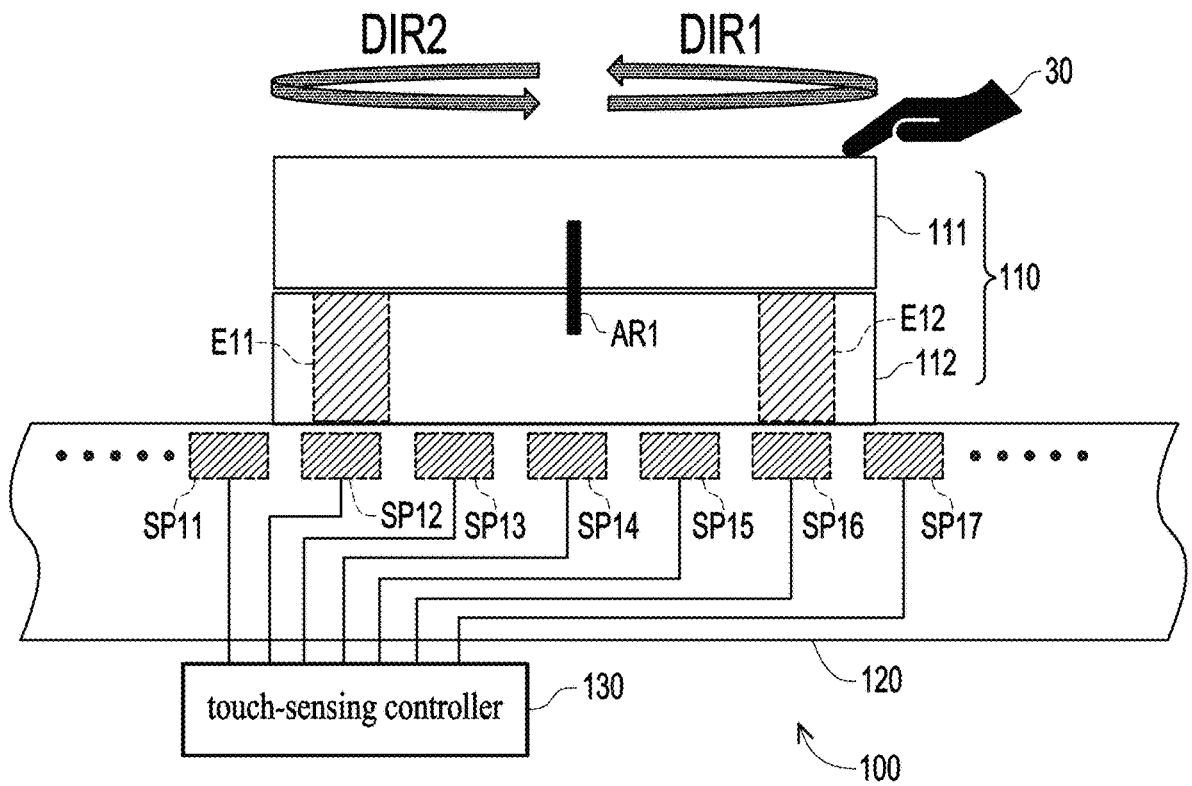
FIG. 1 is a schematic block diagram of a circuit of a knob apparatus according to an embodiment of the disclosure.

The word "coupling (or connection)" used throughout the specification of this application (including the claims) can refer to any direct or indirect connection means. For example, if a first device is described as being coupled (or connected) to a second device, it should be interpreted as meaning that the first device can be directly connected to the second device, or that the first device can be indirectly connected to the second device by other devices or some means of connection. The terms "first" and "second", etc. mentioned throughout the full text of the specification of this application (including the claims) are used to name elements or to distinguish different embodiments or scopes, and are not used to limit the upper or lower limit of the number of elements, nor are they used to limit the order of the elements. In addition, wherever possible, elements/components/steps with the same reference numerals are used in the drawings and embodiments to represent the same or similar parts. Elements/components/steps using the same reference numerals or using the same terms in different embodiments can refer to the relevant descriptions of each other.

FIG. 1 is a schematic block diagram of a circuit of a knob apparatus 100 according to an embodiment of the disclosure. The knob apparatus 100 shown in FIG. 1 includes a knob 110, a touch panel 120, and a touch-sensing controller 130. Depending on different designs, in some embodiments, the touch-sensing controller 130 may be implemented as a hardware circuit. In other embodiments, the touch-sensing controller 130 may be implemented in the form of firmware, software (i.e., program), or a combination of the foregoing. In some embodiments, the implementation of the touch-sensing controller 130 may be a combination of hardware, firmware, and software.

In terms of hardware form, the touch-sensing controller 130 may be implemented in a logic circuit on an integrated circuit. For example, relevant functions of the touch-sensing controller 130 may be implemented in one or more controller, microcontroller, microprocessor, application-specific integrated circuit (ASICs), digital signal processor (DSP), field programmable gate array (FPGA), central processing unit (CPU) and/or various logic blocks, modules, and circuits in other processing units. Relevant functions of the touch-sensing controller 130 may be implemented as hardware circuits, such as various logic blocks, modules, and circuits in integrated circuits, using hardware description languages (e.g., Verilog HDL or VHDL) or other suitable programming languages.

In terms of software form and/or firmware form, the relevant functions of the touch-sensing controller 130 may be implemented as programming codes. For example, the touch-sensing controller 130 is implemented using general programming languages (e.g., C, C++, or combination language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic apparatus (e.g., a computer, CPU, controller, microcontroller, or microprocessor) may read and execute the programming code from the non-transitory machine-readable storage medium, thereby realizing relevant functions of the touch-sensing controller 130.

The touch panel has multiple touch-sensing electrodes, such as (but not limited to) touch-sensing electrodes SP11, SP12, SP13, SP14, SP15, SP16, and SP17 shown in FIG. 1. The touch-sensing controller 130 is coupled to the touch-sensing electrodes. The touch-sensing controller 130 may detect a touch event of the touch panel 120 through the touch-sensing electrodes. This embodiment does not limit the implementation of the touch panel 120. For example, depending on the actual design, the touch panel 120 may be a conventional display panel with a touch detection function or other touch detection panels.

The knob 110 described in this embodiment is attached to the touch panel 120 to form a knob on touch display. Based on the actuation/control of the touch-sensing controller 130, the touch panel 120 may sense the knob 110. Thus, a user (e.g., a driver) does not need to be distracted from viewing the touch panel 120 (e.g., touch screen) when performing in-vehicle controls on the touch panel 120, thereby enhancing driving safety.

In the embodiment shown in FIG. 1, the knob 110 has a knob cap 111 and a base 112. The base 112 is attached to touch panel 120. The knob cap 111 is pivoted on the base 112. Based on twisting by a user 30, the knob cap 111 may be rotated on an axis of rotation AR1 of the base 112. For example, the user 30 may twist the knob cap 111 according to a rotation direction DIR1, or twist the knob cap 111 according to a rotation direction DIR2.

Figure 2:
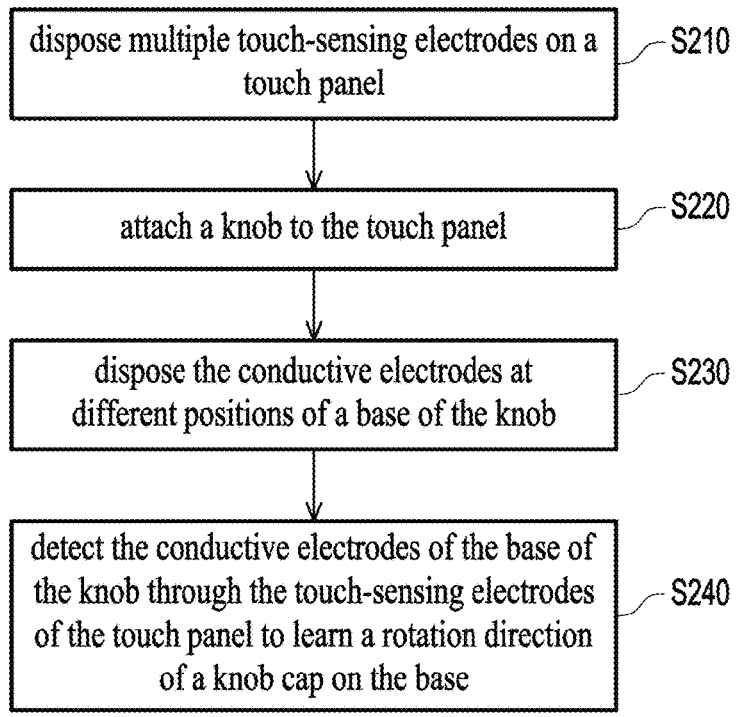
FIG. 2 is a schematic flowchart of an operating method of a knob apparatus according to an embodiment of the disclosure.

FIG. 2 is a schematic flowchart of an operating method of a knob apparatus according to an embodiment of the disclosure. Referring to FIG. 1 and FIG. 2, in step S210, multiple touch-sensing electrodes (e.g., the touch-sensing electrodes SP11 to SP17 shown in FIG. 1) are disposed on the touch panel 120. In step S220, the knob 110 is attached to the touch panel 120. In step S230, multiple conductive electrodes (e.g., conductive electrodes E11 and E12 shown in FIG. 1) are disposed at different positions of the base 112 of the knob 110. It should be noted that the conductive electrodes E11 and E12 shown in FIG. 1 are only schematic diagrams. The position, quantity, and geometry of the conductive electrodes of the base 112 may be determined according to the actual design.

In step S240, the touch-sensing controller 130 may detect the conductive electrodes E11 and E12 of the base 112 of the knob 110 through the touch-sensing electrodes SP11 to SP17 of the touch panel 120 to learn the rotation direction of the knob cap 111 on the base 112. During the process of twisting the knob cap 111 by the user 30, the base 112 is fixedly attached to the touch panel 120, so that the knob 110 does not rub against the touch panel 120.

Figure 3:
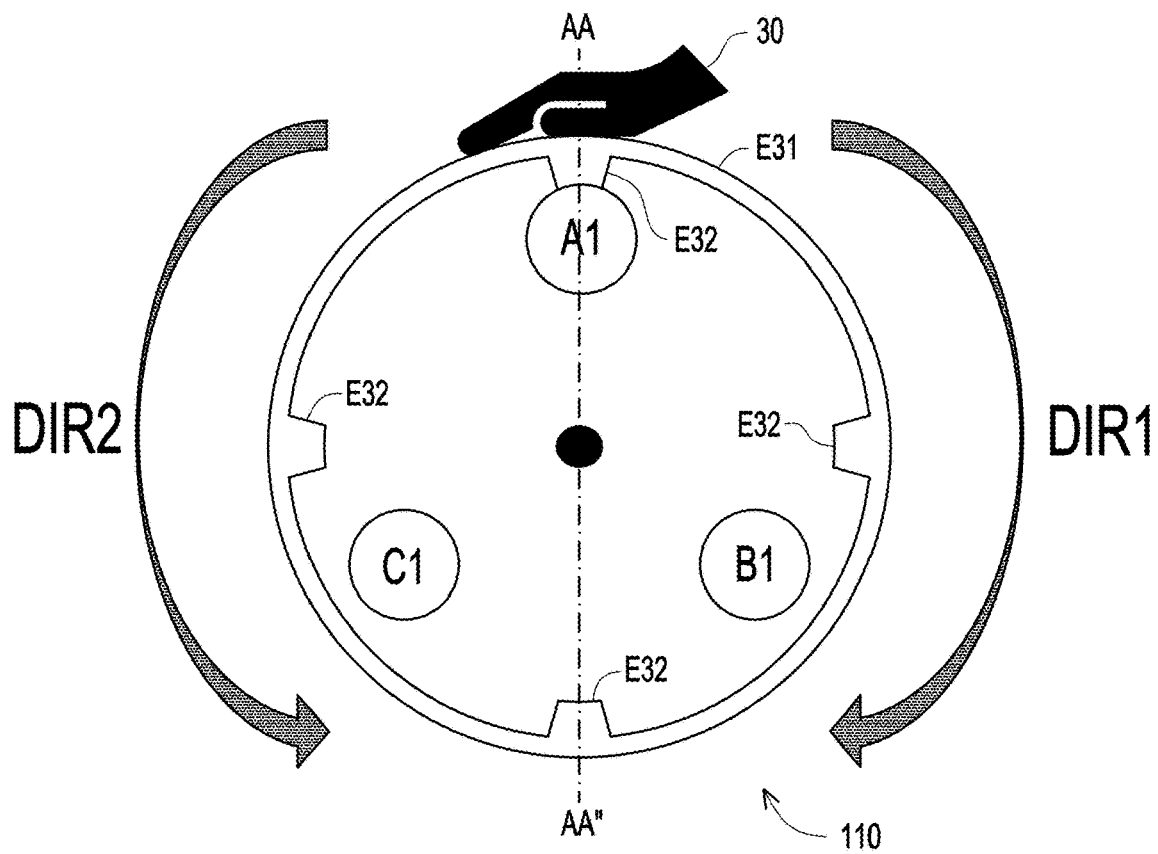
FIG. 3 is a schematic top diagram of a knob according to an embodiment of the disclosure.

FIG. 3 is a schematic top diagram of a knob 110 according to an embodiment of the disclosure. In the embodiment shown in FIG. 3, the base 112 has conductive electrodes A1, B1 and C1. The conductive electrodes A1, B1 and C1 shown in FIG. 3 can be referred to the relevant description of the conductive electrodes E11 and E12 shown in FIG. 1. The conductive electrodes A1, B1 and C1 shown in FIG. 3 may be used as one of many implementation examples of the conductive electrodes E11 and E12 shown in FIG. 1. In the embodiment shown in FIG. 3, the knob cap 111 includes a hand contact portion E31 and an electrical path E32. When the knob cap 111 is operated by a hand of the user 30, the hand contact portion E31 is adapted to contact the hand of the user 30. A material of the hand contact portion E31 can be any conductive material. A first end of the electrical path E32 is coupled to the hand contact portion E31. Based on rotation of the knob cap 111 on the base 112, a second end of the electrical path E32 may be selectively coupled to one of the conductive electrodes A1, B1 and C1 of the base 112. It should be noted that the conductive electrode A1, the conductive electrode B1, the conductive electrode C1, the hand contact portion E31, and the electrical path E32 shown in FIG. 3 are only schematic diagrams. The position, quantity, and geometry of the conductive electrodes, the hand contact portion, and the electrical path may be determined according to the actual design.

Figure 4:
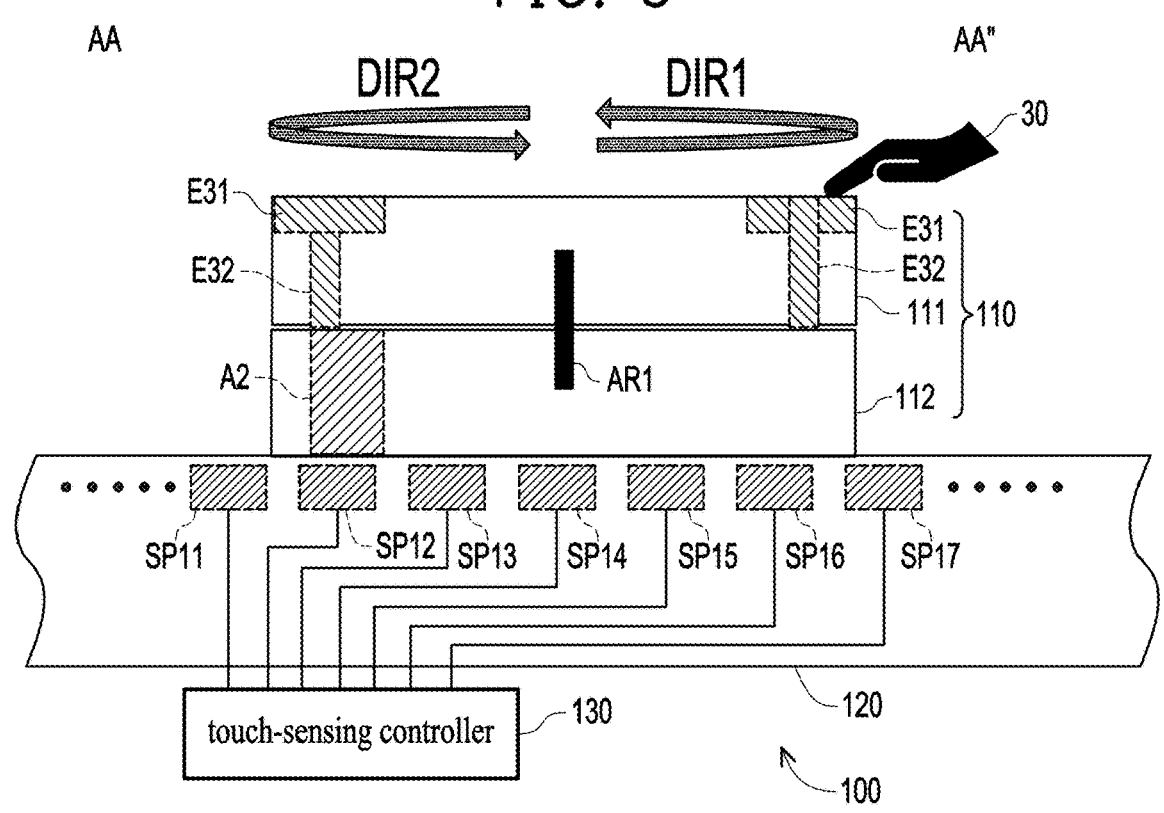
FIG. 4 is a schematic cross-sectional diagram of a knob along a section line AA-AA" shown in FIG. 3, according to an embodiment of the disclosure.

FIG. 4 is a schematic cross-sectional diagram of a knob 110 along a section line AA-AA" shown in FIG. 3, according to an embodiment of the disclosure. The conductive electrode A1, the hand contact portion E31, and the electrical path E32 shown in FIG. 4 can be referred to the related description of the conductive electrode A1, the hand contact portion E31, and the electrical path E32 shown in FIG. 3. The hand contact portion E31 and the electrical path E32 shown in FIG. 4 can be used as one of many implementation examples of the hand contact portion E31 and the electrical path E32 shown in FIG. 3. When the knob cap 111 is operated by the hand of the user 30, the hand of the user 30 can contact the hand contact portion E31. The first end of the electrical path E32 is coupled to the hand contact portion E31. Based on the rotation of the knob cap 111 on the base 112, the second end of the electrical path E32 may be selectively coupled to one of the conductive electrodes A1, B1 and C1 of the base 112. It should be noted that the conductive electrode A1, the hand contact portion E31, and the electrical path E32 shown in FIG. 4 are only schematic diagrams. The position, quantity, and geometry of the conductive electrodes, the hand contact portion, and the electrical path may be determined according to the actual design.

Referring to FIG. 3 and FIG. 4, when the hand of the user 30 contacts the hand contact portion E31 and the second end of the electrical path E32 is selectively coupled to the conductive electrode A1 of the base 112, the touch-sensing controller 130 may detect a touch event of the hand of the user 30 through the touch-sensing electrode SP12, the first conductive electrode A1, the electrical path E32, and the hand contact portion E31. This embodiment does not limit the detection method of the touch event performed by the touch-sensing controller 130 on the touch-sensing electrodes SP11 to SP17 of the touch panel 120. For example, according to the actual design, the touch-sensing controller 130 can actuate/control the touch panel 120 to perform conventional detection or other detection on the touch event.

That is, when the hand of the user 30 contacts the hand contact portion E31 and the second end of the electrical path E32 is selectively coupled to the conductive electrode A1 of the base 112, the touch-sensing controller 130 may know that the touch event occurs at the position of the conductive electrode A1 of the touch panel 120 (at the position of the touch-sensing electrode SP12). Similarly, when the hand of the user 30 contacts the hand contact portion E31 and the second end of the electrical path E32 is selectively coupled to the conductive electrode B1 or C1 shown in FIG. 3, the touch-sensing controller 130 may know that the touch event occurs at the position of the conductive electrode B1 or C1 of the touch panel 120.

Figures 5, 6:
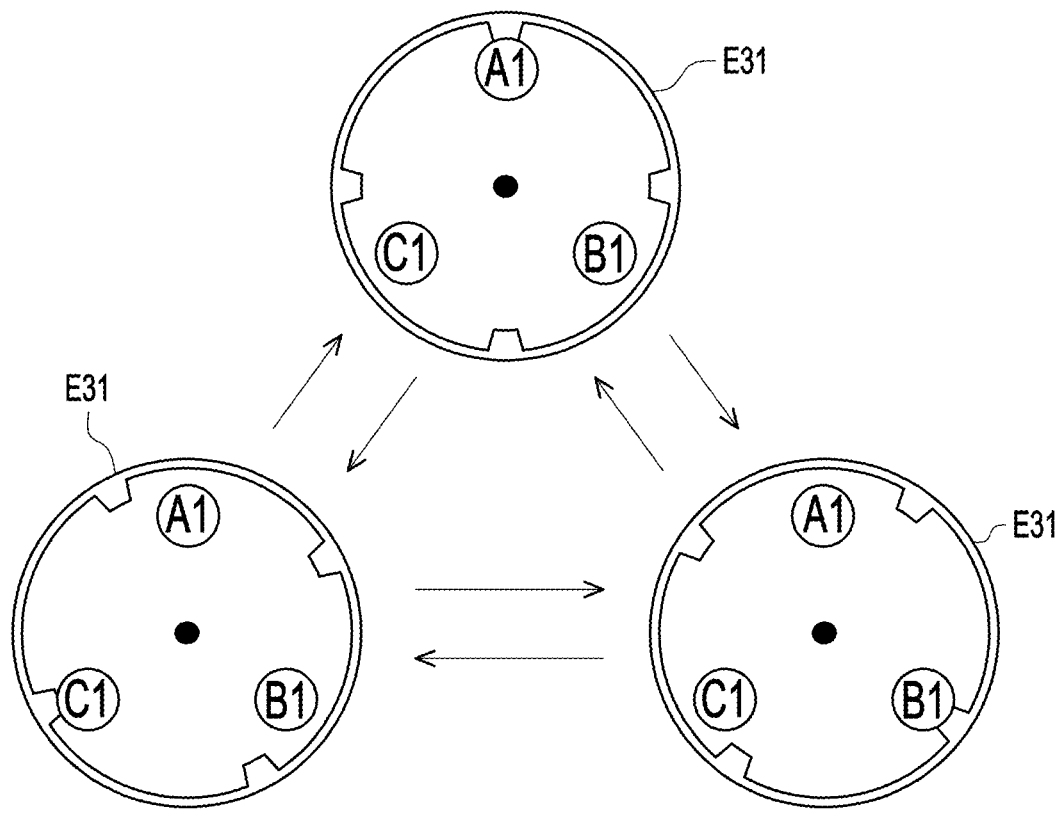
FIG. 5 is a schematic diagram of different states when a hand of a user operates a knob cap according to an embodiment of the disclosure.
FIG. 6 is a schematic diagram of different states when a touch event occurs at a position of a conductive electrode of a base according to an embodiment of the disclosure.

FIG. 5 is a schematic diagram of different states when a hand of a user 30 operates a knob cap 111 according to an embodiment of the disclosure. The conductive electrode A1, the conductive electrode B1, the conductive electrode C1, and the hand contact portion E31 shown in FIG. 5 can be referred to the relevant description of the conductive electrode A1, the conductive electrode B1, the conductive electrode C1, and the hand contact portion E31 shown in FIG. 3. When the knob cap 111 is operated by the hand of the user 30, the hand contact portion E31 may be selectively coupled to the conductive electrodes A1, B1, or C1 through an electrical path, as shown in FIG. 5. The touch-sensing controller 130 can detect whether a touch event occurs at positions of the conductive electrodes A1, B1, and C1 of the base 112 through different touch-sensing electrodes of the touch panel 120. Based on a sequence of occurrence of the touch event at the conductive electrodes A1, B1 and C1, the touch-sensing controller 130 may determine the rotation direction of the knob cap 111 on the base 112.

FIG. 6 is a schematic diagram of different states when a touch event occurs at the positions of the conductive electrodes A1, B1, and C1 of the base 112 according to an embodiment of the disclosure. The horizontal axis of FIG. 6 represents the positions of the conductive electrodes A1, B1, or C1 of the base 112, while the vertical axis represents the different states. The touch-sensing controller 130 may convert detection results of the conductive electrodes A1, B1, and C1 of the base 112 into a current code. The current code may indicate that the touch event occurs at a single electrode of the conductive electrodes A1, B1, and C1 of the base 112.

Referring to FIG. 5 and FIG. 6, when the hand of the user 30 contacts the hand contact portion E31 and the hand contact portion E31 is selectively coupled to the conductive electrode A1 of the base 112 through the electrical path, the touch-sensing controller 130 may know that a touch event occurs at the position of the conductive electrode A1 of the touch panel 120, but no touch event occurs in other conductive electrodes B1 and C1. At this time, the touch-sensing controller 130 may convert the detection results of the conductive electrodes A1, B1, and C1 into a current code "100" (i.e., state 1 shown in FIG. 6). Similarly, when the hand of the user 30 contacts the hand contact portion E31 and the hand contact portion E31 is selectively coupled to the conductive electrode B1 of the base 112 through the electrical path, the touch-sensing controller 130 may convert the detection results of the conductive electrodes A1, B1, and C1 into a current code "010" (i.e., state 2 shown in FIG. 6). When the hand of the user 30 contacts the hand contact portion E31 and the hand contact portion E31 is selectively coupled to the conductive electrode C1 of the base 112 through the electrical path, the touch-sensing controller 130 may convert the detection results of the conductive electrodes A1, B1, and C1 into a current code "001" (i.e., state 3 shown in FIG. 6).

The touch-sensing controller 130 may compare the current code with the previous code to determine whether the knob cap 111 has been rotated, and then determine the rotation direction of the knob cap 111. When the current code and the previous code indicate that the sequence of occurrence of the touch event at the conductive electrodes A1, B1, and C1 is a first sequence (e.g., state 1→state 2→state 3→state 1), the touch-sensing controller 130 may determine the rotation direction of the knob cap 111 is clockwise. When the current code and the previous code indicate that the sequence of occurrence of the touch event at the conductive electrodes A1, B1 and C1 is a second sequence (e.g., state 3→state 2→state 1→state 3), the touch-sensing controller 130 may determine that the rotation direction of the knob cap 111 is counterclockwise.

Figure 7:
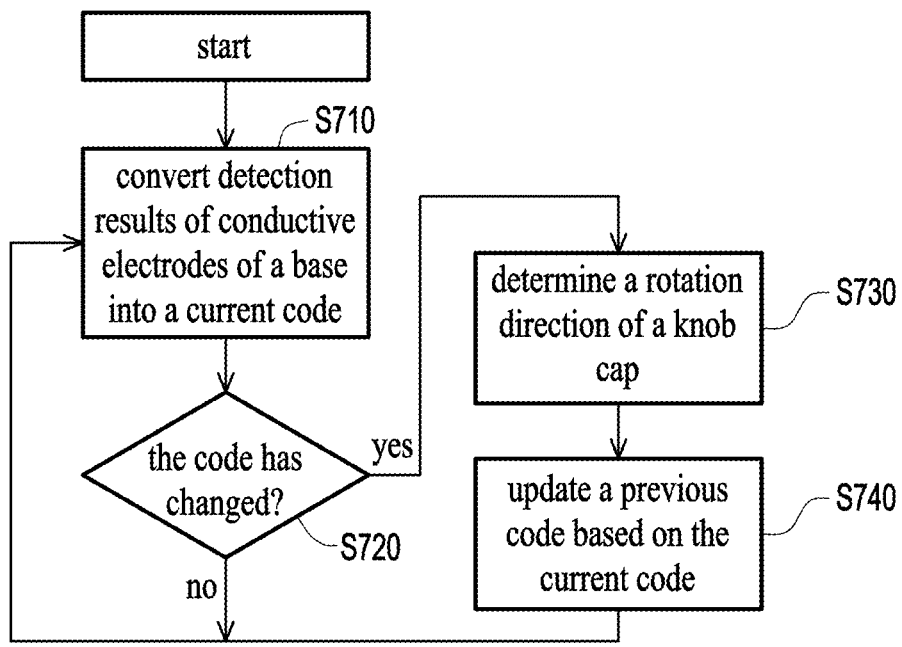
FIG. 7 is a schematic flowchart of an operating method of a knob apparatus according to another embodiment of the disclosure.

FIG. 7 is a schematic flowchart of an operating method of a knob apparatus according to another embodiment of the disclosure. In step S710, the touch-sensing controller 130 may convert the detection results of the conductive electrodes A1, B1 and C1 of the base 112 into the current code. In step S720, the touch-sensing controller 130 may compare the current code with the previous code to determine whether the code has changed (i.e., determine whether the knob cap 111 has been rotated). If the code has not changed (i.e., a determination result in step S720 is "no"), then go back to step S710 to update the current code. If the current code is changed (i.e., the determination result of step S720 is "yes"), step S730 is performed to determine the rotation direction of the knob cap 111. The details of the determination in step S730 can be referred to the relevant description of FIG. 5 and FIG. 6, and therefore will not be repeated in the following. The touch-sensing controller 130 may report the rotation direction (or even rotation speed) of the knob cap 111 to a system to trigger/adjust corresponding application functions (e.g., adjusting temperature, volume, or other system values). In step S740, the touch-sensing controller 130 may update the previous code based on the current code. After completing step S740, the touch-sensing controller 130 may go back to step S710 to update the current code.

Figure 8:
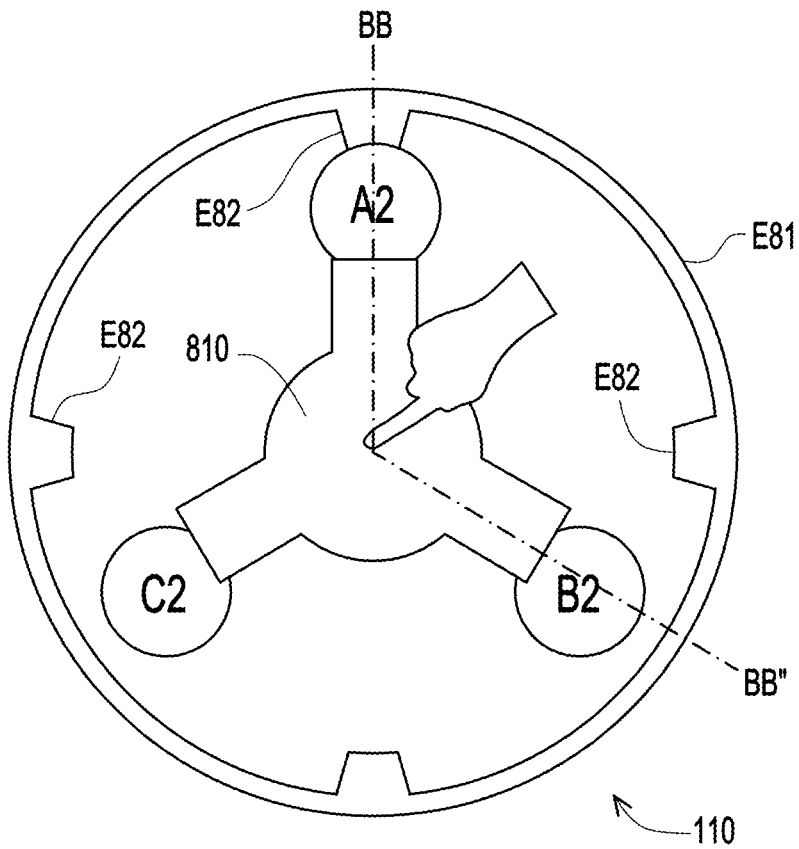
FIG. 8 is a schematic top diagram of a knob according to another embodiment of the disclosure.

FIG. 8 is a schematic top diagram of a knob 110 according to another embodiment of the disclosure. In the embodiment shown in FIG. 8, the knob cap 111 includes a hand contact portion E81 and an electrical path E82, and the base 112 has conductive electrodes A2, B2 and C2. The hand contact portion E81, the electrical path E82, the conductive electrode A2, the conductive electrode B2, and the conductive electrode C2 shown in FIG. 8 can be referred to the relevant description of the hand contact portion E31, the electrical path E32, the conductive electrode A1, the conductive electrode B1, and the conductive electrode C1 shown in FIG. 3. The conductive electrodes A2, B2, and C2 shown in FIG. 8 can be used as one of many implementation examples of the conductive electrodes E11 and E12 shown in FIG. 1. In the embodiment shown in FIG. 8, the knob cap 111 further includes a pressing member 810. When the knob cap 111 is pressed by hand of the user 30, the pressing member 810 is adapted to electrically connect the conductive electrodes A2, B2, and C2 of the base 112. The touch-sensing controller 130 may detect whether the "touch event" occurs at the same time at the conductive electrodes A2, B2, and C2 of the base 112 through different touch-sensing electrodes of the touch panel 120 to determine whether the knob cap 111 has been pressed.

Figure 9A:
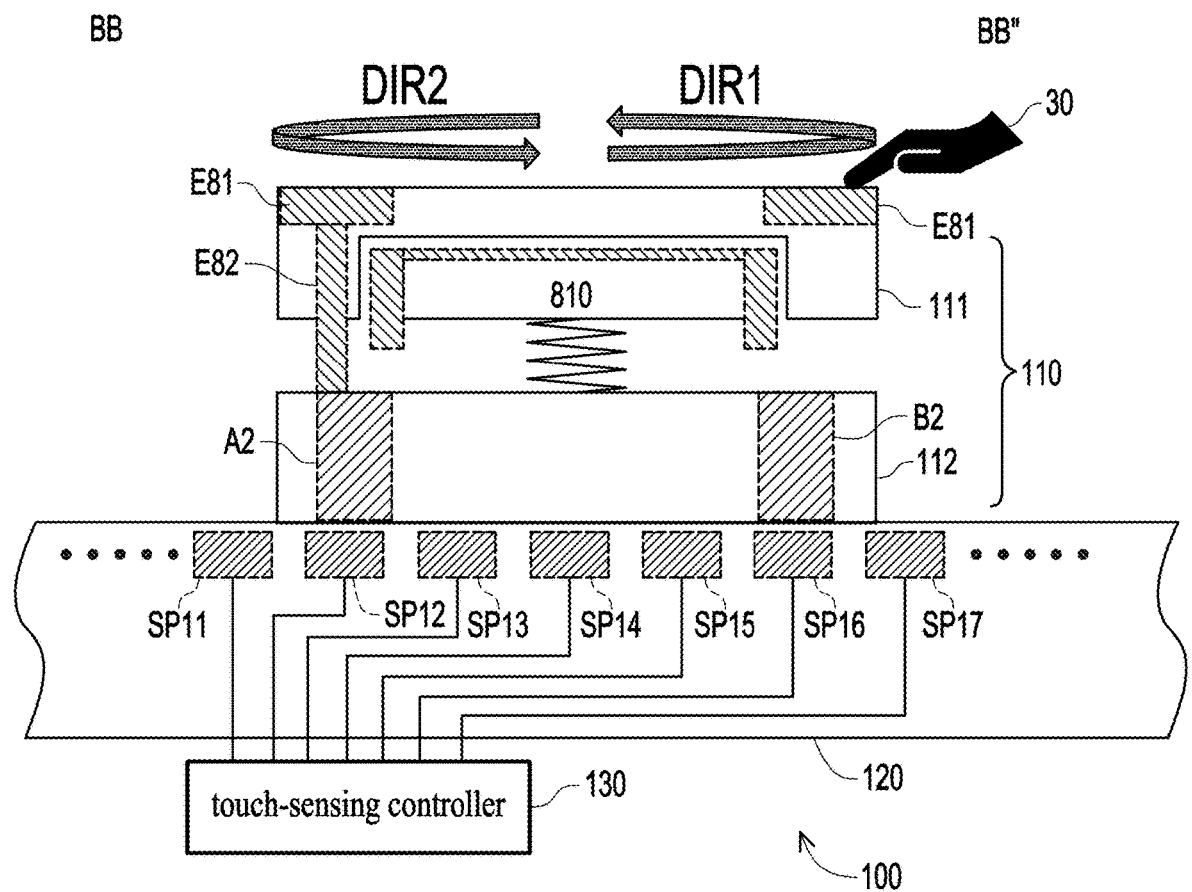
FIG. 9A and FIG. 9B are schematic cross-sectional diagrams of a knob along a section line BB-BB" shown in FIG. 8, according to still another embodiment of the disclosure.
Figure 9B:
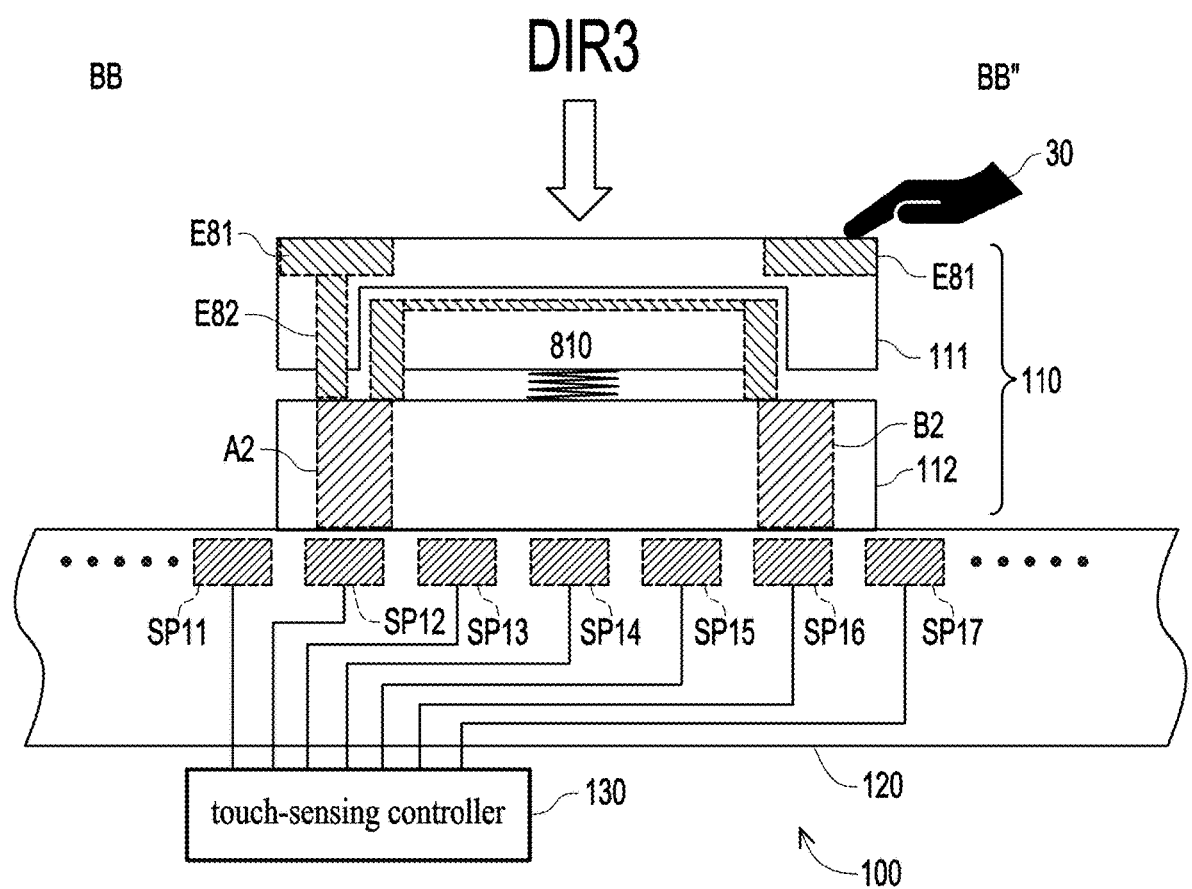

FIG. 9A and FIG. 9B are schematic cross-sectional diagrams of a knob 110 along a section line BB-BB" shown in FIG. 8, according to still another embodiment of the disclosure. The conductive electrode A2, the conductive electrode B2, the hand contact portion E81, and the electrical path E82 shown in FIG. 9A and FIG. 9B can be referred to the relevant description of the conductive electrode A2, the conductive electrode B2, the hand contact portion E81, and the electrical path E82 shown in FIG. 8. The hand contact portion E81 and the electrical path E82 shown in FIG. 9A and FIG. 9B can be used as one of many implementation examples of the hand contact portion E81 and the electrical path E82 shown in FIG. 8. The conductive electrode A2, the conductive electrode B2, the hand contact portion E81, and the electrical path E82 shown in FIG. 9A and FIG. 9B can be referred to the relevant description of the conductive electrode A1, the hand contact portion E31, and the electrical path E32 shown in FIG. 4, and be analogized to each other.

FIG. 9A is a schematic diagram of a state in which the knob cap 111 has not been pressed. When the knob cap 111 is operated by the hand of the user 30, the hand of the user 30 may contact the hand contact portion E31 for rotation of the knob cap 111 on the base 112. For example, the user 30 can twist the knob cap 111 according to the rotation direction DIR1, or rotate the knob cap 111 according to the rotation direction DIR2. A rotation sensing operation of the knob 110, the touch panel 120, and the touch-sensing controller 130 in a state shown in FIG. 9A can be referred to the relevant description of a rotation sensing operation shown in FIG. 3 to FIG. 7, and be analogized to each other, and therefore will not be repeated in the following. In the state in which the knob cap 111 has not been pressed, the pressing member 810 is in an electrical floating state.

FIG. 9B is a schematic diagram of a state in which the knob cap 111 is pressed. Referring to FIG. 8 and FIG. 9B, when the hand of the user 30 presses the knob cap 111 in a pressing direction DIR3, the pressing member 810 of the knob cap 111 is electrically connected to the conductive electrodes A2, B2, and C2 of the base 112. The touch-sensing controller 130 may detect whether the "touch event" occurs at the same time at the conductive electrodes A2, B2, and C2 of the base 112 through different touch-sensing electrodes of the touch panel 120 to determine whether the knob cap 111 is pressed.

Figure 10:
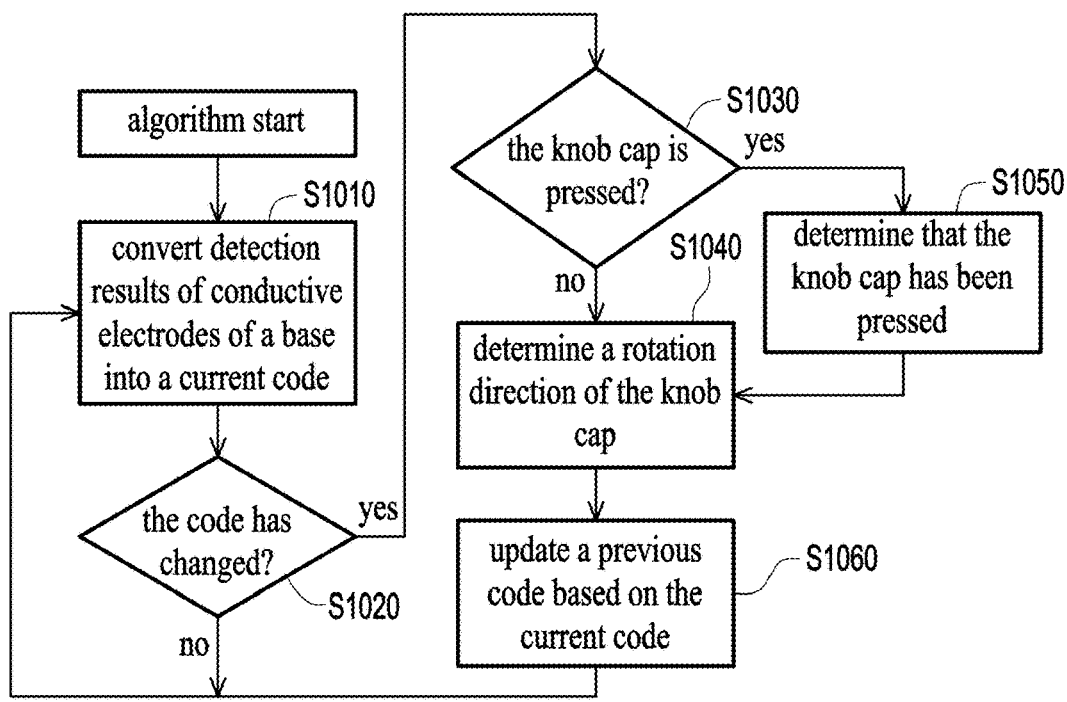
FIG. 10 is a schematic flowchart of an operating method of a knob apparatus according to still another embodiment of the disclosure.

FIG. 10 is a schematic flowchart of an operating method of a knob apparatus according to still another embodiment of the disclosure. Steps S1010, S1020, S1040, and S1060 shown in FIG. 10 can be referred to the relevant description of steps S710, S720, S730, and S740 shown in FIG. 7, and be analogized to each other, and therefore will not be repeated in the following. If the current code is changed (i.e., the determination result of step S1020 is "yes"), step S1030 is performed to determine whether the knob cap 111 is pressed. In step S1030, the touch-sensing controller 130 may check the current code. If the current code is not "111" (the determination result of step S1030 is "no"), then step S1040 is performed to determine the rotation direction of knob cap 111. If the current code is "111" (i.e., the determination result of step S1030 is "yes"), step S1050 is performed to determine that the knob cap 111 has been pressed, and then step S1060 is proceed.

Figure 11:
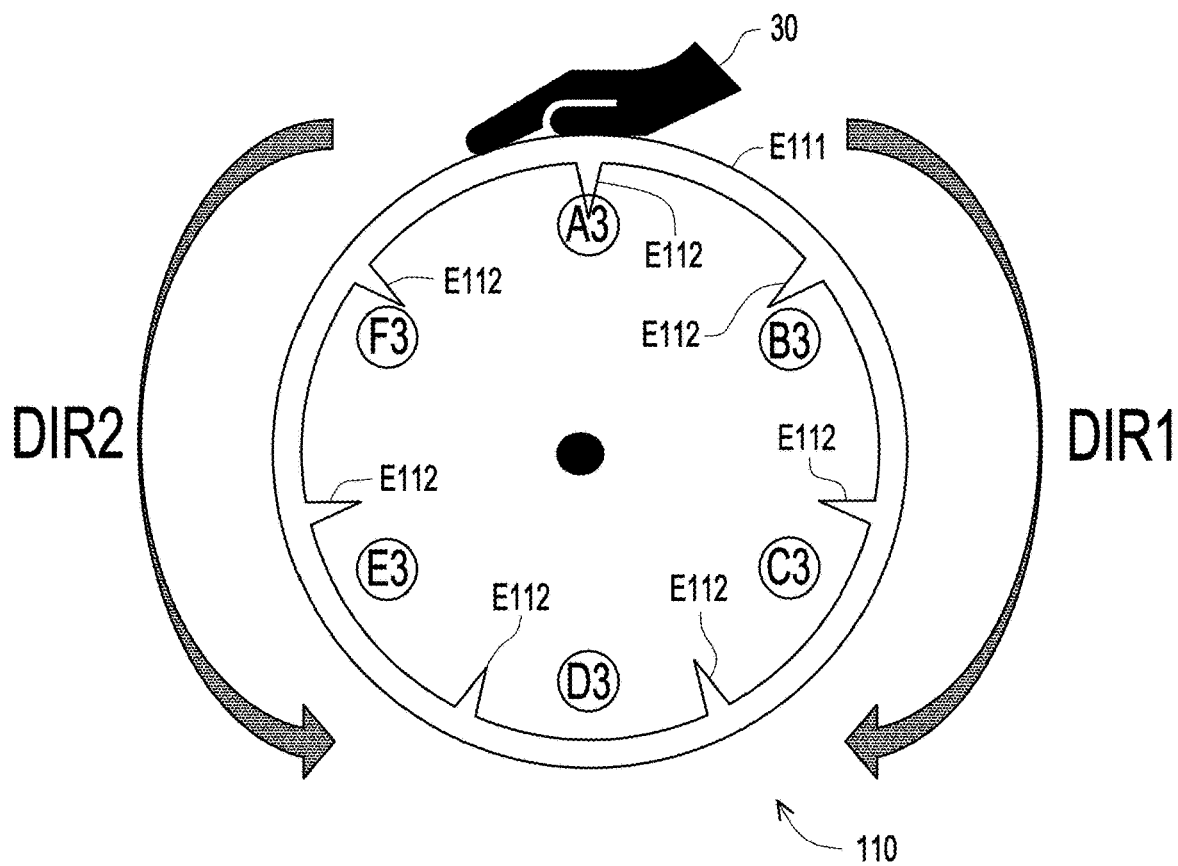
FIG. 11 is a schematic top diagram of a knob according to yet another embodiment of the disclosure.

FIG. 11 is a schematic top diagram of a knob 110 according to yet another embodiment of the disclosure. In the embodiment shown in FIG. 11, the knob cap 111 has a hand contact portion E111 and an electrical path E112, and the base 112 has conductive electrodes A3, B3, C3, D3, E3, and F3. The hand contact portion E111, the electrical path E112, and the conductive electrodes A3 to F3 shown in FIG. 11 can be referred to the relevant description of the hand contact portion E31, the electrical path E32, and the conductive electrodes A1 to C1 shown in FIG. 3, and be analogized to each other. The conductive electrodes A3 to F3 shown in FIG. 11 can be used as one of many implementation examples of the conductive electrodes E11 and E12 shown in FIG. 1.

In the embodiment shown in FIG. 11, when the knob cap 111 is operated by the hand of the user 30, based on the rotation of the knob cap 111 on the base 112, a second end of the electrical path E112 may be selectively coupled to one of conductive electrodes A3 to F3 of the base 112. It should be noted that the conductive electrodes A3 to F3, the hand contact portion E111, and the electrical path E112 shown in FIG. 11 are only schematic diagrams. The position, quantity, and geometry of the conductive electrodes, the hand contact portion, and the electrical path may be determined according to the actual design.

Figures 12, 13:
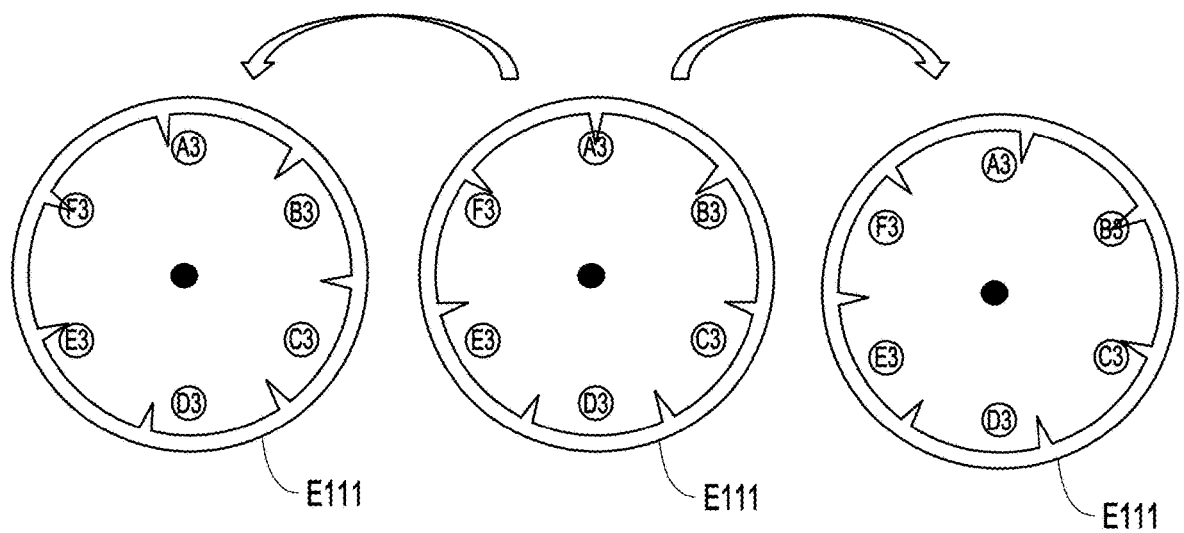
FIG. 12 is a schematic diagram of different states when a hand of a user operates a knob cap according to another embodiment of the disclosure.
FIG. 13 is a schematic diagram of different states when a touch event occurs at a position of a conductive electrode of a base according to another embodiment of the disclosure.

FIG. 12 is a schematic diagram of different states when a hand of a user 30 operates a knob cap 111 according to another embodiment of the disclosure. The conductive electrodes A3 to F3 and the hand contact portion E111 shown in FIG. 12 can be referred to the relevant description of the conductive electrodes A3 to F3 and the hand contact portion E111 shown in FIG. 11. When the knob cap 111 is operated by the hand of the user 30, the hand contact portion E111 may be selectively coupled to one of the conductive electrodes A3 to F3 through an electrical path, as shown in FIG. 12. The touch-sensing controller 130 may detect whether a touch event occurs at positions of the conductive electrodes A3 to F3 of the base 112 through different touch-sensing electrodes of the touch panel 120. Based on a sequence of occurrence of the touch event occurs at the conductive electrodes A3 to F3, the touch-sensing controller 130 may determine the rotation direction of the knob cap 111 on the base 112.

FIG. 13 is a schematic diagram of different states when a touch event occurs at positions of the conductive electrodes A3 to F3 of the base 112 according to another embodiment of the disclosure. The horizontal axis of FIG. 13 represents the positions of the conductive electrodes A3 to F3 of the base 112, and the vertical axis represents different states. The touch-sensing controller 130 may convert detection results of the conductive electrodes A3 to F3 of the base 112 into a current code. The current code may indicate that the touch event occurs at a single electrode of the conductive electrodes A3 to F3 of the base 112.

Referring to FIG. 11 and FIG. 13, when the hand of the user 30 contacts the hand contact portion E111 and the hand contact portion E111 is selectively coupled to the conductive electrode A3 of the base 112 through an electrical path, the touch-sensing controller 130 may know that a touch event occurs at the position of the conductive electrode A3 of the touch panel 120, but no touch event occurs in other conductive electrodes B3 to F3. At this time, the touch-sensing controller 130 may convert the detection results of the conductive electrodes A3 to F3 into a current code "10000" (i.e., state 1 shown in FIG. 13). Similarly, when the hand of the user 30 contacts the hand contact portion E111 and the hand contact portion E111 is selectively coupled to one of the conductive electrodes B3 to F3 of the base 112 through an electrical path, the touch-sensing controller 130 may convert the detection results of the conductive electrodes A3 to F3 into current codes "010000" (i.e., state 2 shown in FIG. 13), "001000" (i.e., state 3 shown in FIG. 13), and "000100" (i.e., state 4 shown in FIG. 13), "000010" (i.e., state 5 shown in FIG. 13), or "000001" (i.e., state 6 shown in FIG. 13).

The touch-sensing controller 130 may compare the current code with the previous code to determine whether the knob cap 111 has been rotated, and then determine the rotation direction of the knob cap 111. When the current code and the previous code indicate that the sequence of occurrence of the touch event at the conductive electrodes A3 to F3 is a first sequence (e.g., state 1→state 2→state 3→state 4→state 5→state 6→state 1), the touch-sensing controller 130 may determine that the rotation direction of the knob cap 111 is clockwise. When the current code and the previous code indicate that the sequence of occurrence of the touch event at the conductive electrodes A3 to F3 is a second sequence (e.g., state 6→state 5→state 4→state 3→state 2→state 1→state 6), the touch-sensing controller 130 may determine that the rotation direction of the knob cap 111 is counterclockwise.

Figure 14:
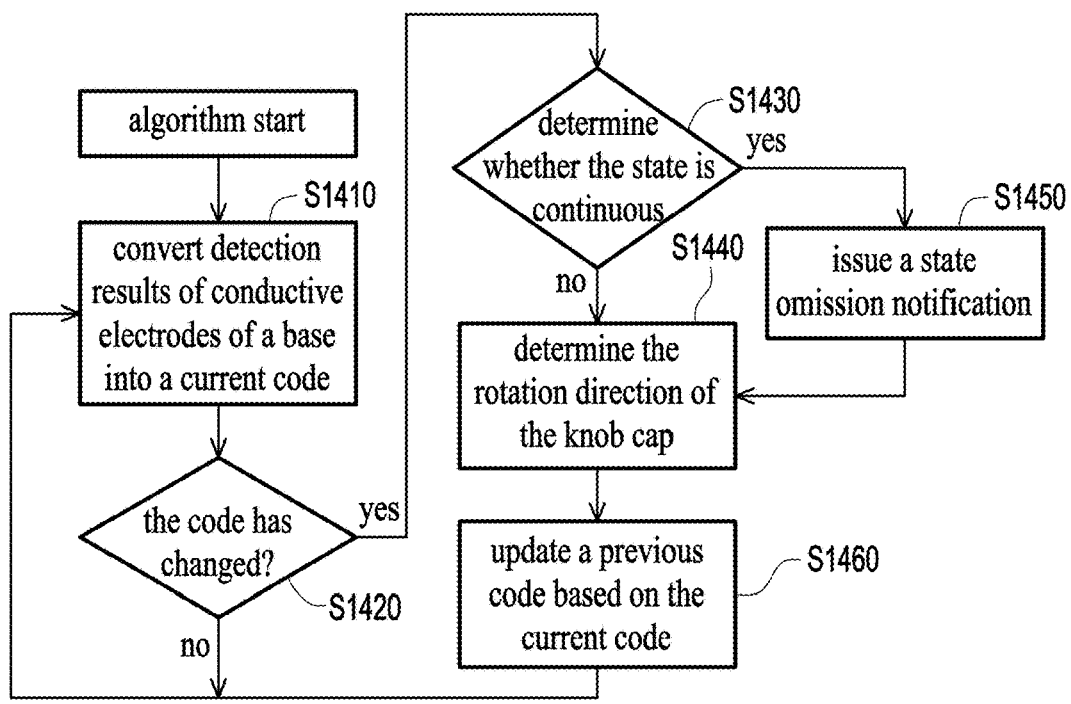
FIG. 14 is a schematic flowchart of an operating method of a knob apparatus according to still another embodiment of the disclosure.

FIG. 14 is a schematic flowchart of an operating method of a knob apparatus according to still another embodiment of the disclosure. Steps S1410, S1420, S1440, and S1460 shown in FIG. 14 can be referred to the relevant description of steps S710, S720, S730, and S740 shown in FIG. 7, and be analogized to each other, and therefore will not be repeated in the following. If the current code is changed (i.e., the determination result in step S1420 is "yes"), step S1430 is performed to determine whether the state is continuous. If the state is continuous (i.e., the determination result of step S1430 is "yes"), step S1440 is performed to determine the rotation direction of the knob cap 111. If the state is discontinuous (i.e., the determination result in step S1430 is "no"), step S1450 is performed to issue a state omission notification. For example, if the current code represents state 3 shown in FIG. 13 and the previous code represents state 1 shown in FIG. 13, the touch-sensing controller 130 may determine that the states are not continuous (i.e., state 2 is missing). Typically, rotating the knob cap 111 too quickly may cause state to be lost. At this time, the touch-sensing controller 130 may report the state omission notification to the system, and then proceed to step S1140.

Figure 15:
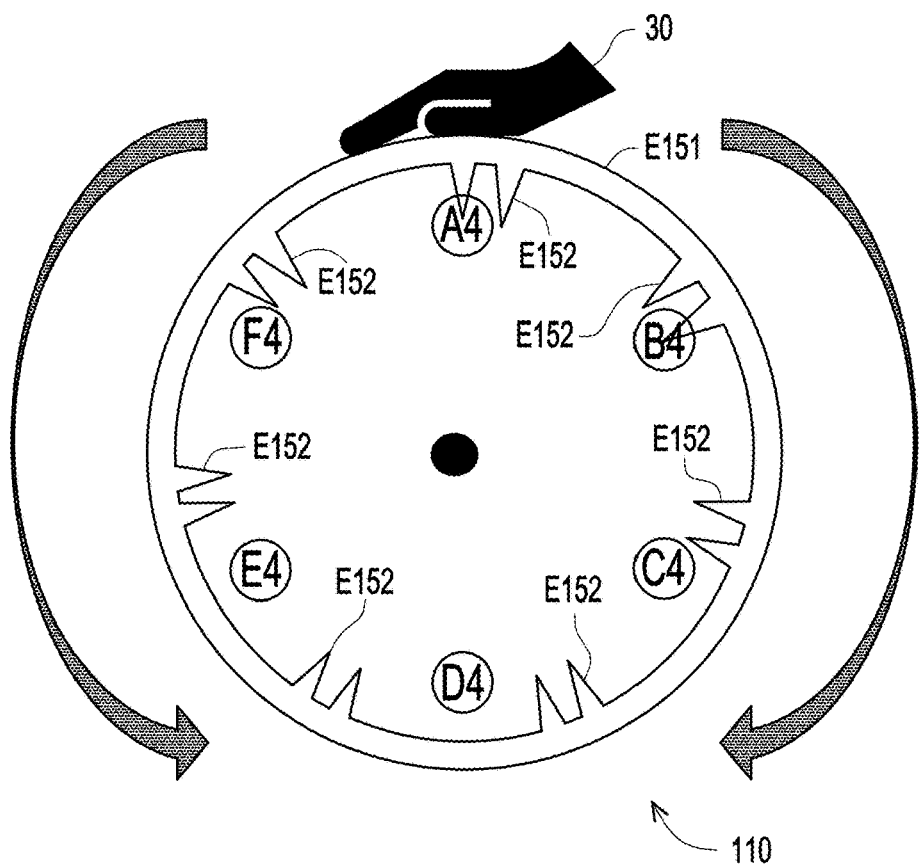
FIG. 15 is a schematic top diagram of a knob according to a further embodiment of the disclosure.

FIG. 15 is a schematic top diagram of a knob 110 according to a further embodiment of the disclosure. In the embodiment shown in FIG. 15, the knob cap 111 has a hand contact portion E151 and an electrical path E152, and the base 112 has conductive electrodes A4, B4, C4, D4, E4, and F4. The hand contact portion E151, the electrical path E152, and the conductive electrodes A4 to F4 shown in FIG. 15 can be referred to the relevant description of the hand contact portion E31, the electrical path E32, and the conductive electrodes A1 to C1 shown in FIG. 3, and be analogized to each other, or be referred to the relevant description of the hand contact portion E111, the electrical path E112, and the conductive electrodes A3 to F3 shown in FIG. 11, and be analogized to each other. The conductive electrodes A4 to F4 shown in FIG. 15 can be used as one of many implementation examples of the conductive electrodes E11 and E12 shown in FIG. 1.

In the embodiment shown in FIG. 15, when the knob cap 111 is operated by the hand of the user 30, based on the rotation of the knob cap 111 on the base 112, a second end of the electrical path E152 can be selectively coupled to one of the conductive electrodes A4 to F4 of the base 112. It should be noted that the conductive electrodes A4 to F4, the hand contact portion E151, and the electrical path E152 shown in FIG. 15 are only schematic diagrams. The position, quantity, and geometry of the conductive electrodes, the hand contact portion, and the electrical path may be determined according to the actual design.

Figures 16, 17:
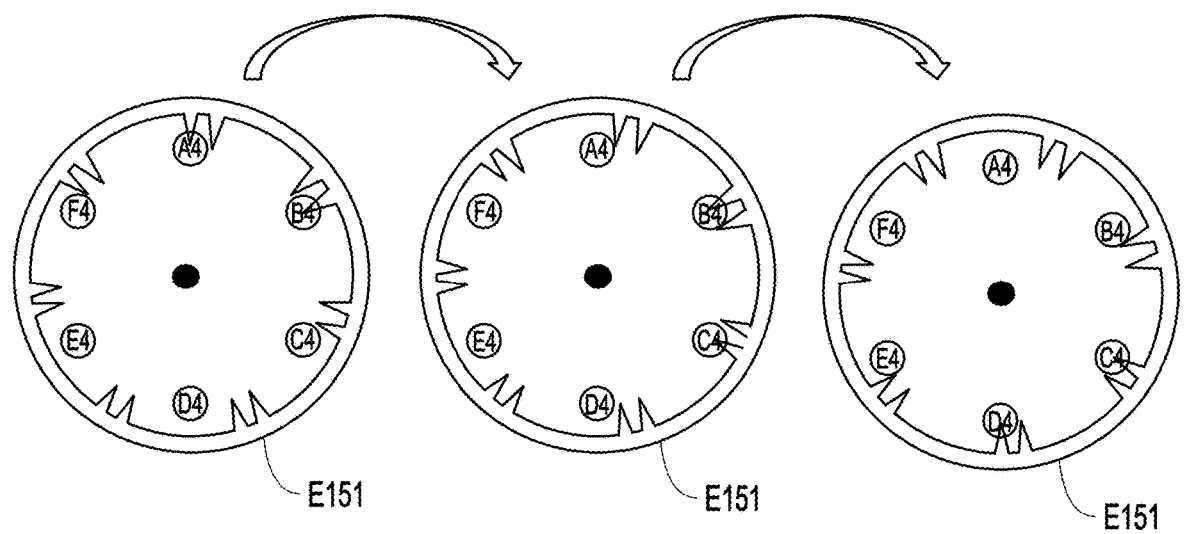
FIG. 16 is a schematic diagram of different states when a hand of a user operates a knob cap according to still another embodiment of the disclosure.
FIG. 17 is a schematic diagram of different states when a touch event occurs at a position of a conductive electrode of a base according to another embodiment of the disclosure.

FIG. 16 is a schematic diagram of different states when a hand of a user 30 operates a knob cap 111 according to still another embodiment of the disclosure. The conductive electrodes A4 to F4 and the hand contact portion E151 shown in FIG. 16 can be referred to the relevant description of the conductive electrodes A4 to F4 and the hand contact portion E151 shown in FIG. 15. When the knob cap 111 is operated by the hand of the user 30, the hand contact portion E151 may be selectively coupled to multiple of the conductive electrodes A4 to F4 through the electrical path, as shown in FIG. 16. The touch-sensing controller 130 may detect whether the touch event occurs at positions of the conductive electrodes A4 to F4 of the base 112 through different touch-sensing electrodes of the touch panel 120. Based on a sequence of occurrence of the touch event at the conductive electrodes A4 to F4, the touch-sensing controller 130 may determine the rotation direction of the knob cap 111 on the base 112.

FIG. 17 is a schematic diagram of different states when a touch event occurs at positions of the conductive electrodes A4 to F4 of a base 112 according to another embodiment of the disclosure. The horizontal axis of FIG. 17 represents the positions of the conductive electrodes A4 to F4 of the base 112, and the vertical axis represents different states. The touch-sensing controller 130 may convert detection results of the conductive electrodes A4 to F4 of the base 112 into a current code. The current code may represent the touch event occurs at multiple adjacent electrodes of the conductive electrodes A4 to F4 of the base 112.

Referring to FIGS. 15 and 17, when the hand of the user 30 contacts the touch portion E151 and the touch portion E151 is selectively coupled to the conductive electrodes A4 and B4 of the base 112 through the electrical path, the touch-sensing controller 130 may know that a touch event occurs at positions of the conductive electrodes A4 and B4 of the touch panel 120, but no touch event occurs at other conductive electrodes C4 to F4. At this time, the touch-sensing controller 130 may convert the detection results of the conductive electrodes A4 to F4 into a current code "110000" (i.e., state 1 shown in FIG. 17). Similarly, when the hand of the user 30 contacts the hand contact portion E111 and the hand contact portion E111 is selectively coupled to adjacent multiple of the conductive electrodes A4 to F4 of the base 112 through the electrical path, the touch-sensing controller 130 may convert the detection results of the conductive electrodes A4 to F4 into current codes "011000" (i.e., state 2 shown in FIG. 17), "001100" (i.e., state 3 shown in FIG. 17), "000110" (i.e., state 4 shown in FIG. 17), "000011" (i.e., state 5 shown in FIG. 17) or "100001" (i.e., state 6 shown in FIG. 17).

The touch-sensing controller 130 may compare the current code with the previous code to determine whether the knob cap 111 has been rotated, and then determine the rotation direction of the knob cap 111. When the current code and the previous code indicate that the sequence of occurrence of the touch event at the conductive electrodes A4 to F4 is the first sequence (e.g., state 1→state 2→state 3→state 4→state 5→state 6→state 1), the touch-sensing controller 130 may determine that the rotation direction of the knob cap 111 is clockwise. When the current code and the previous code indicate that the sequence of occurrence of the touch event at the conductive electrodes A4 to F4 is the second sequence (e.g., state 6→state 5→state 4→state 3→state 2→state 1→state 6), the touch-sensing controller 130 may determine that the rotation direction of the knob cap 111 is counterclockwise.

Figure 18:
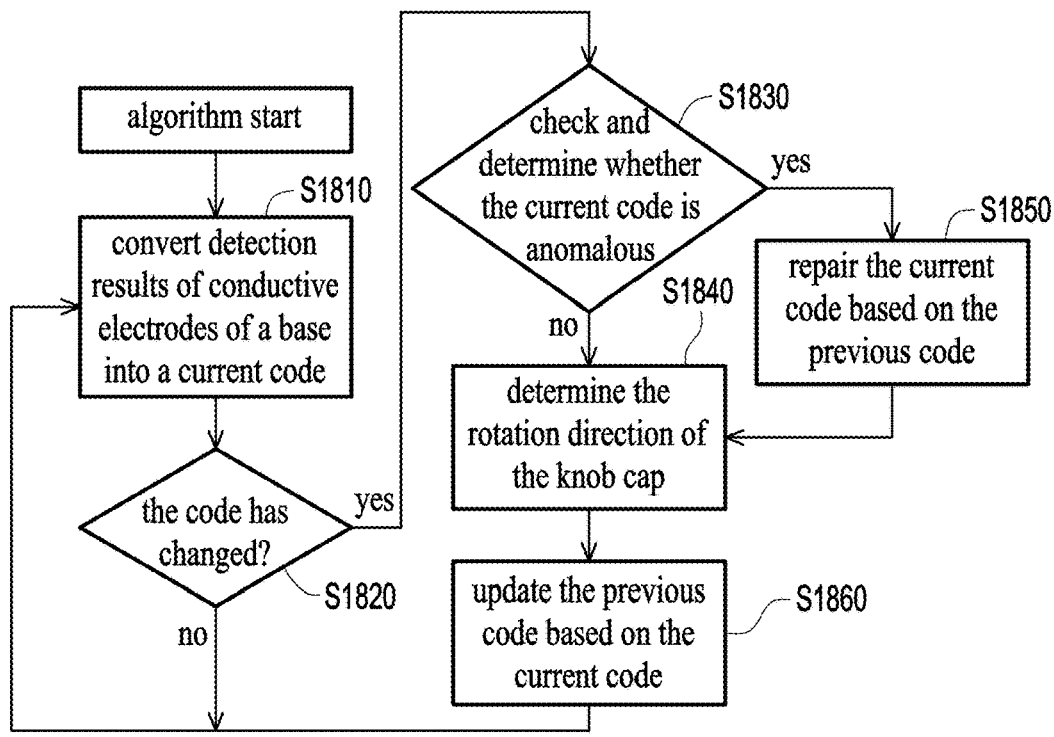
FIG. 18 is a schematic flowchart of an operating method of a knob apparatus according to yet another embodiment of the disclosure.

FIG. 18 is a schematic flowchart of an operating method of a knob apparatus according to yet another embodiment of the disclosure. Steps S1810, S1820, S1840, and S1860 shown in FIG. 18 may be referred to the relevant description of steps S710, S720, S730 and S740 shown in FIG. 7, and be analogized to each other, and therefore will not be repeated in the following. If the current code is changed (i.e., the determination result in step S1820 is "yes"), step S1830 is performed. In step S1830, the touch-sensing controller 130 may check and determine whether the current code is anomalous. If there is no anomaly in the current code (i.e., the determination result of step S1830 is "no"), step S1840 is performed to determine the rotation direction of the knob cap 111. If the current code is anomalous (i.e., the determination result in step S1830 is "yes"), step S1850 is proceed.

When the current code is anomalous, the touch-sensing controller 130 may repair the current code based on the previous code in step S1850. For example, if the current code is "010000" and the previous code is "110000", the touch-sensing controller 130 may determine that the current code "010000" is anomalous (i.e., a sensing result of the conductive electrode C4 is lost). At this time, the touch-sensing controller 130 may repair the current code "010000" to "011000" based on the previous code "110000", and then step S1840 is proceeded.

Figure 19:
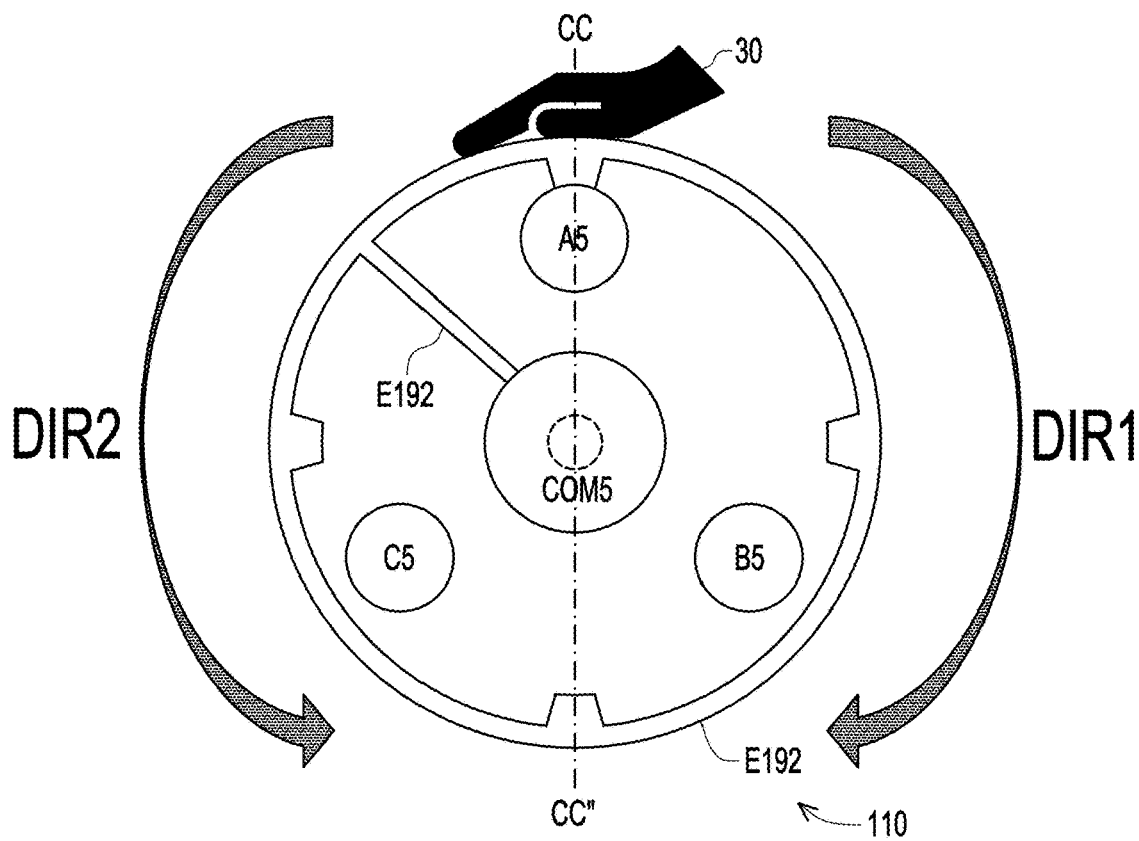
FIG. 19 is a schematic top diagram of a knob according to a further embodiment of the disclosure.

FIG. 19 is a schematic top diagram of a knob 110 according to a further embodiment of the disclosure. In the embodiment shown in FIG. 19, the knob cap 111 includes an electrical path E192, and the base 112 has a common electrode COM5, a conductive electrode A5, a conductive electrode B5, and a conductive electrode C5. The common electrode COM5, the conductive electrode A5, the conductive electrode B5, and the conductive electrode C5 may be made of any conductive material. The conductive electrodes A5, B5, and C5 shown in FIG. 19 can be referred to the relevant description of the conductive electrodes A1, B1, and C1 shown in FIG. 3. The conductive electrodes A5, B5, and C5 shown in FIG. 19 may be used as one of many implementation examples of the conductive electrodes E11 and E12 shown in FIG. 1.

A material of the electrical path E192 may be any conductive material. A first end of the electrical path E192 is coupled to the common electrode COM5. When the knob cap 111 operated by the hand of the user 30, a second end of the electrical path E192 is selectively coupled to one of the conductive electrodes A5, B5, and C5 of the base 112 based on the rotation of the knob cap 111 on the base 112. It should be noted that the conductive electrode A5, the conductive electrode B5, the conductive electrode C5, the common electrode COM5, and the electrical path E192 shown in FIG. 19 are only schematic diagrams. The position, quantity, and geometry of the conductive electrodes, the common electrode, and the electrical path may be determined according to the actual design. For example, the relevant description of the embodiment shown in FIG. 19 may be applied by analogy to the embodiment shown in FIG. 8 or FIG. 11. In other embodiments, the second end of the electrical path E192 may be selectively coupled to multiple of the conductive electrodes A5, B5, and C5 of the base 112 based on the rotation of the knob cap 111 on the base 112. For example, the relevant description of the embodiment shown in FIG. 19 may be applied to the embodiment shown in FIG. 15 by analogy.

Figure 20:
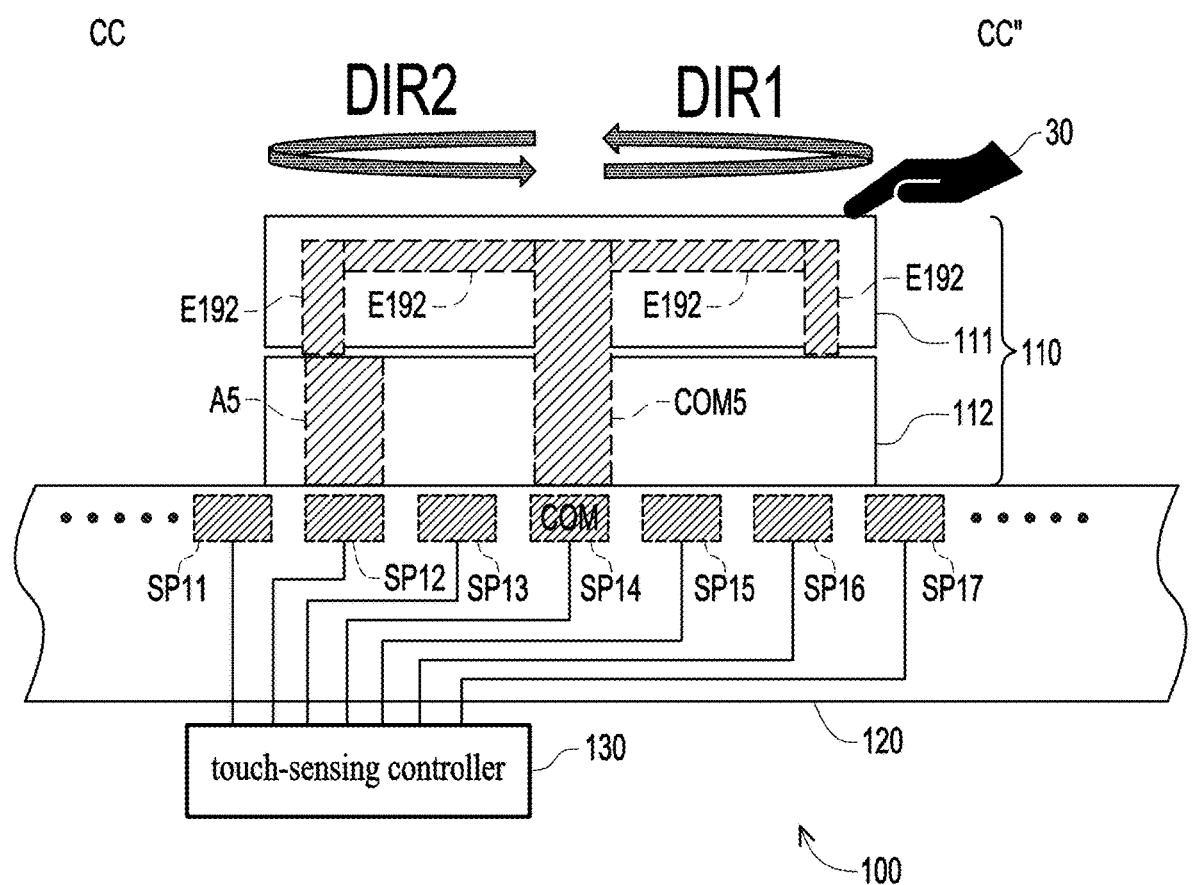
FIG. 20 is a schematic cross-sectional diagram of a knob along a section line CC-CC" shown in FIG. 19, according to an embodiment of the disclosure.

FIG. 20 is a schematic cross-sectional diagram of a knob 110 along a section line CC-CC" shown in FIG. 19, according to an embodiment of the disclosure. The conductive electrode A5, the common electrode COM5, and the electrical path E192 shown in FIG. 20 can be referred to the relevant description of the conductive electrode A5, the common electrode COM5, and the electrical path E192 shown in FIG. 19. The electrical path E192 shown in FIG. 20 may be used as one of many implementation examples of the electrical path E192 shown in FIG. 19. The first end of the electrical path E192 of the knob cap 111 is coupled to the common electrode COM5 of the base 112. When the knob cap 111 is operated by the hand of the user 30, based on the rotation of the knob cap 111 on the base 112, the second end of the electrical path E192 may be selectively coupled to one of the conductive electrodes A5, B5, and C5 of the base 112. It should be noted that the electrical path E192, the conductive electrode A5, the common electrode COM5, and the electrical path E192 shown in FIG. 20 are only schematic diagrams. The position, quantity, and geometry of the electrical path, the conductive electrodes, and the common electrode may be determined according to the actual design. For example, the relevant descriptions of the embodiment shown in FIG. 20 may be applied by analogy to the embodiments shown in FIG. 9A to FIG. 9B.

Referring to FIG. 19 and FIG. 20, the touch-sensing controller 130 may provide a touch driving signal COM to the common electrode COM5 of the base 112 of the knob 110 through at least one of the touch-sensing electrodes of the touch panel 120 (e.g., the touch-sensing electrode SP14). This embodiment does not limit the implementation of the touch driving signal COM. For example, according to the actual design, the touch driving signal COM may be a ground voltage, a pulse signal, a clock signal, or other driving signals. The user 30 may twist the knob cap 111 according to the rotation direction DIR1, or twist the knob cap 111 according to the rotation direction DIR2. When the knob cap 111 is operated by the hand of the user 30, and the second end of the electrical path E192 is selectively coupled to the conductive electrode (e.g., the conductive electrode A5) of the base 112, the touch driving signal COM may be transmitted to the conductive electrode A5 from the touch-sensing electrode SP14 through the common electrode COM5 and the electrical path E192.

The touch-sensing controller 130 may detect all the conductive electrodes of the base 112 of the knob 110 through all the touch-sensing electrodes (e.g., the touch-sensing electrodes SP11 to SP17) of the touch panel 120 to learn the rotation direction of the knob cap 111 on the base 112. Taking the operation scenario shown in FIG. 20 as an example, when the second end of the electrical path E192 is selectively coupled to the conductive electrode A5 of the base 112, the touch-sensing controller 130 may detect the touch driving signal COM of the conductive electrode A5 of the base 112 through the touch-sensing electrode SP12 of the touch panel 120. At this time, other conductive electrodes B5 and C5 of the base 112 have no touch driving signal COM. That is, when the second end of the electrical path E192 is selectively coupled to the conductive electrode A5 of the base 112, the touch-sensing controller 130 may know that the touch event occurs at the position of the conductive electrode A5 of the touch panel 120 (at the position of the touch-sensing electrode SP12). Similarly, when the second end of the electrical path E192 is selectively coupled to the conductive electrode B5 or C5 shown in FIG. 19, the touch-sensing controller 130 may know that the touch event occurs at the position of the conductive electrode B5 or C5 of the touch panel 120.

The relevant descriptions of FIG. 5, FIG. 6, and FIG. 7 can be applied by analogy to the embodiments shown in FIG. 19 and FIG. 20. The touch-sensing controller 130 may detect whether a touch event occurs at the positions of the conductive electrodes A5, B5, and C5 of the base 112 through different touch-sensing electrodes of the touch panel 120. Based on the sequence of occurrence of the touch event at the conductive electrodes A5, B5, and C5, the touch-sensing controller 130 may determine the rotation direction of the knob cap 111 on the base 112.

In summary, the knob 110 described in the embodiments may be attached to the touch panel 120. The knob 110 has the base 112 and the knob cap 111. The knob cap 111 is pivoted on the base 112, and the base 112 is attached to the touch panel 120. There are different conductive electrodes at different positions of the base 112 of the knob 110. Based on the rotational motion of the knob cap 111 on the base 112, the conductive electrodes of the base 112 of the knob undergo electrical changes (e.g., capacitive characteristics change). The touch-sensing controller 1300 may detect the conductive electrodes of the base 112 of the knob through the touch-sensing electrodes of the touch panel 120 to obtain different sensing results. Based on the difference in the sensing results of the conductive electrodes of the base 112 of the knob, the touch-sensing controller 130 may learn the rotation direction of the knob cap 111 on the base 112. Thus, the knob apparatus 100 may realize the physical knob function on the touch panel 120.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A knob apparatus, comprising:
a touch panel, having a plurality of touch-sensing electrodes;
a touch-sensing controller, coupled to the touch-sensing electrodes of the touch panel, configured to detect a touch event of the touch panel through the touch-sensing electrodes; and
a knob, having a base and a knob cap, wherein the knob cap is pivoted on the base, the base is attached to the touch panel, a plurality of conductive electrodes are disposed at different positions of the base, and the touch-sensing controller detects the conductive electrodes of the base of the knob through the touch-sensing electrodes of the touch panel to learn a rotation direction of the knob cap on the base,
wherein the knob cap comprises:
a hand contact portion, wherein when the knob cap is operated by a hand, the hand contact portion is adapted to contact the hand; and
an electrical path, wherein a first end of the electrical path is coupled to the hand contact portion, and a second end of the electrical path is selectively coupled to one or more of the conductive electrodes of the base based on rotation of the knob cap on the base.

2. The knob apparatus according to claim 1, wherein when the hand contacts the hand contact portion and the second end of the electrical path is selectively coupled to a first conductive electrode of the conductive electrodes of the base, the touch-sensing controller detects the touch event of the hand through the touch-sensing electrodes, the first conductive electrode, the electrical path, and the hand contact portion.

3. The knob apparatus according to claim 1, wherein the touch-sensing controller detects whether the touch event occurs at the positions of the conductive electrodes of the base through the touch-sensing electrodes, and the touch-sensing controller determines the rotation direction of the knob cap on the base based on a sequence of occurrence of the touch event at the conductive electrodes.

4. The knob apparatus according to claim 3, wherein the touch-sensing controller converts a detection result of the conductive electrodes of the base into a current code, the touch-sensing controller compares the current code with a previous code to determine whether the knob cap has been rotated, and updates the previous code based on the current code.

5. The knob apparatus according to claim 4, wherein the current code indicates that the touch event occurs at a single electrode among the conductive electrodes of the base.

6. The knob apparatus according to claim 4, wherein the current code indicates that the touch event occurs at a plurality of adjacent electrodes among the conductive electrodes of the base.

7. The knob apparatus according to claim 4, wherein the touch-sensing controller determines that the rotation direction of the knob cap is clockwise when the current code and the previous code indicate that the sequence of occurrence of the touch event at the conductive electrodes is a first sequence, and the touch-sensing controller determines that the rotation direction of the knob cap is counterclockwise when the current code and the previous code indicate that the sequence of occurrence of the touch event at the conductive electrodes is a second sequence different from the first sequence.

8. The knob apparatus according to claim 4, wherein the touch-sensing controller checks whether the current code is anomalous, and
when the current code is anomalous, the touch-sensing controller repairs the current code based on the previous code.

9. A knob apparatus, comprising:
a touch panel, having a plurality of touch-sensing electrodes;
a touch-sensing controller, coupled to the touch-sensing electrodes of the touch panel, configured to detect a touch event of the touch panel through the touch-sensing electrodes; and
a knob, having a base and a knob cap, wherein the knob cap is pivoted on the base, the base is attached to the touch panel, a plurality of conductive electrodes are disposed at different positions of the base, and the touch-sensing controller detects the conductive electrodes of the base of the knob through the touch-sensing electrodes of the touch panel to learn a rotation direction of the knob cap on the base,
wherein the knob cap comprises:
a pressing member, wherein when the hand presses the knob cap, the pressing member is adapted to electrically connect the conductive electrodes of the base,
wherein the touch-sensing controller detects, through the touch-sensing electrodes, whether the touch event occurs at the same time at the conductive electrodes of the base to determine whether the knob cap has been pressed.

10. A knob apparatus, comprising:
a touch panel, having a plurality of touch-sensing electrodes;
a touch-sensing controller, coupled to the touch-sensing electrodes of the touch panel, configured to detect a touch event of the touch panel through the touch-sensing electrodes; and
a knob, having a base and a knob cap, wherein the knob cap is pivoted on the base, the base is attached to the touch panel, a plurality of conductive electrodes are disposed at different positions of the base, and the touch-sensing controller detects the conductive electrodes of the base of the knob through the touch-sensing electrodes of the touch panel to learn a rotation direction of the knob cap on the base,
wherein a common electrode is further disposed on the base, the touch-sensing controller provides a touch driving signal to the common electrode of the base of the knob through at least one of the touch-sensing electrodes of the touch panel, the knob cap comprises an electrical path, a first end of the electrical path is coupled to the common electrode, a second end of the electrical path is selectively coupled to one or more of the conductive electrodes of the base based on rotation of the knob cap on the base, and the touch-sensing controller detects the conductive electrodes of the base of the knob through the touch-sensing electrodes of the touch panel to learn the rotation direction of the knob cap on the base.

11. The knob apparatus according to claim 10, wherein when the second end of the electrical path is selectively coupled to a first conductive electrode of the conductive electrodes of the base, the touch-sensing controller detects the touch driving signal of the first conductive electrode through the touch-sensing electrodes.

12. An operating method of a knob apparatus, comprising:
disposing a plurality of touch-sensing electrodes on a touch panel, wherein the touch-sensing electrodes are configured to detect a touch event of the touch panel;
attaching a knob to the touch panel, wherein the knob has a base and a knob cap, and the knob cap is pivoted on the base;
disposing a plurality of conductive electrodes at different positions of the base of the knob; and
detecting the conductive electrodes of the base of the knob through the touch-sensing electrodes of the touch panel to learn a rotation direction of the knob cap on the base,
wherein the knob cap comprises a hand contact portion and an electrical path, the hand contact portion is adapted to contact a hand when the knob cap is operated by the hand, a first end of the electrical path is coupled to the hand contact portion, and a second end of the electrical path is selectively coupled to one or more of the conductive electrodes of the base based on rotation of the knob cap on the base.

13. The operation method according to claim 12, further comprising:
detecting the touch event of the hand through the touch-sensing electrodes, a first conductive electrode of the conductive electrodes of the base, the electrical path, and the hand contact portion when the hand contacts the hand contact portion and the second end of the electrical path is selectively coupled to the first conductive electrode.

14. The operation method according to claim 12, further comprising:
detecting whether the touch event occurs at the positions of the conductive electrodes of the base through the touch-sensing electrodes; and
determining the rotation direction of the knob cap on the base based on a sequence of occurrence of the touch event at the conductive electrodes.

15. The operation method according to claim 14, further comprising:
converting a detection result of the conductive electrodes of the base into a current code;
comparing the current code with a previous code to determine whether the knob cap has been rotated; and
updating the previous code based on the current code.

16. The operating method according to claim 15, wherein the current code indicates that the touch event occurs at a single electrode among the conductive electrodes of the base.

17. The operation method according to claim 15, wherein the current code indicates that the touch event occurs at a plurality of adjacent electrodes among the conductive electrodes of the base.

18. The operation method according to claim 15, further comprising:
determining that the rotation direction of the knob cap is clockwise when the current code and the previous code indicate that the sequence of occurrence of the touch event at the conductive electrodes is a first sequence; and
determining that the rotation direction of the knob cap is counterclockwise when the current code and the previous code indicate that the sequence of occurrence of the touch event at the conductive electrodes is a second sequence different from the first sequence.

19. The operation method according to claim 15, further comprising:
checking whether the current code is anomalous; and
repairing the current code based on the previous code when the current code is anomalous.

20. An operating method of a knob apparatus, comprising:
disposing a plurality of touch-sensing electrodes on a touch panel, wherein the touch-sensing electrodes are configured to detect a touch event of the touch panel;
attaching a knob to the touch panel, wherein the knob has a base and a knob cap, and the knob cap is pivoted on the base;
disposing a plurality of conductive electrodes at different positions of the base of the knob; and
detecting the conductive electrodes of the base of the knob through the touch-sensing electrodes of the touch panel to learn a rotation direction of the knob cap on the base,
wherein the knob cap comprises a pressing member, the pressing member is adapted to electrically connect the conductive electrodes of the base when the hand presses the knob cap, and the operating method further comprises:
detecting, through the touch-sensing electrodes, whether the touch event occurs at the same time at the conductive electrodes of the base to determine whether the knob cap has been pressed.

21. An operation method of a knob apparatus, comprising:
disposing a plurality of touch-sensing electrodes on a touch panel, wherein the touch-sensing electrodes are configured to detect a touch event of the touch panel;
attaching a knob to the touch panel, wherein the knob has a base and a knob cap, and the knob cap is pivoted on the base;
disposing a plurality of conductive electrodes at different positions of the base of the knob; and
detecting the conductive electrodes of the base of the knob through the touch-sensing electrodes of the touch panel to learn a rotation direction of the knob cap on the base,
wherein a common electrode is further disposed on the base, and the operation method further comprises:
providing a touch driving signal to the common electrode of the base of the knob through at least one of the touch-sensing electrodes of the touch panel, wherein the knob cap comprises an electrical path, a first end of the electrical path is coupled to the common electrode, and a second end of the electrical path is selectively coupled to one or more of the conductive electrodes of the base based on rotation of the knob cap on the base; and
detecting the conductive electrodes of the base of the knob through the touch-sensing electrodes of the touch panel to learn the rotation direction of the knob cap on the base.

22. The operation method according to claim 21, further comprising:
detecting the touch driving signal of a first conductive electrode of the conductive electrodes of the base through the touch-sensing electrodes when the second end of the electrical path is selectively coupled to the first conductive electrode.

* * * * *